United States Patent
Farrenkopf et al.

(10) Patent No.: US 6,648,016 B2
(45) Date of Patent: Nov. 18, 2003

(54) VALVE ASSEMBLY FOR A FUEL TANK

(75) Inventors: Markus T. Farrenkopf, Easley, SC (US); Wade V. Williams, Greenville, SC (US); Ralf Leonhardt, Mauldin, SC (US); Scott C. Gaynor, Mauldin, SC (US); David Eisenbacher, Troy, MI (US); Robert Petroskie, Duncan, SC (US)

(73) Assignee: Alfmeier Corporation, Greenville, SC (US)

( * ) Notice: Subject to any disclaimer, the term of this patent is extended or adjusted under 35 U.S.C. 154(b) by 0 days.

(21) Appl. No.: 10/057,734

(22) Filed: Jan. 24, 2002

(65) Prior Publication Data

US 2003/0136448 A1 Jul. 24, 2003

(51) Int. Cl.$^7$ .............................. F16K 15/02; B65B 1/04
(52) U.S. Cl. ..................... 137/588; 137/151; 137/538; 137/592; 251/149.6; 141/301
(58) Field of Search ................... 137/151, 538, 137/587, 588, 592; 251/149.6; 141/301

(56) References Cited

U.S. PATENT DOCUMENTS

| | | |
|---|---|---|
| 4,072,245 A | 2/1978 | Sloan, Jr. |
| 4,714,172 A | 12/1987 | Morris |
| 4,759,458 A | 7/1988 | Fischer |
| 4,816,045 A | 3/1989 | Szlaga et al. |
| 4,826,511 A | 5/1989 | Harris |
| 4,883,103 A | 11/1989 | Szlaga et al. |
| 4,905,726 A | 3/1990 | Kasugai et al. |
| 4,944,779 A | 7/1990 | Szlaga et al. |
| 4,964,391 A | 10/1990 | Hoover |
| 4,977,936 A | 12/1990 | Thompson et al. |
| 5,027,868 A | 7/1991 | Morris et al. |
| 5,148,792 A | 9/1992 | Tuckey |
| 5,167,419 A | 12/1992 | Robertson |
| 5,263,511 A | 11/1993 | Ohasi et al. |
| 5,291,924 A | 3/1994 | Sausner et al. |
| 5,322,100 A | 6/1994 | Buechler et al. |
| 5,421,306 A | 6/1995 | Talaski |
| 5,439,129 A | 8/1995 | Buechler |
| 5,518,026 A | 5/1996 | Benjey |
| 5,524,592 A | 6/1996 | Woody et al. |
| 5,568,828 A | 10/1996 | Harris |
| 5,598,872 A | 2/1997 | Kasugai et al. |
| 5,660,206 A | 8/1997 | Neal et al. |
| 5,730,194 A | 3/1998 | Foltz |
| 5,803,131 A | 9/1998 | Iwasa et al. |
| 5,819,796 A | 10/1998 | Kunimitsu et al. |

(List continued on next page.)

FOREIGN PATENT DOCUMENTS

| | | |
|---|---|---|
| DE | 19903545 | 8/2000 |
| DE | 19912645 | 10/2000 |
| EP | 0437053 | 7/1991 |
| EP | 1033274 | 3/2000 |
| WO | WO 9952731 | 10/1999 |

OTHER PUBLICATIONS

US Patent Publication No. 2003/0116202, entitled "Assembling a Siphonable Filler Tube with A Check Valve On a Fuel Tank", published Jun. 26, 2003.
European Search Report dated Jun. 2, 2003.

Primary Examiner—John Rivell
(74) Attorney, Agent, or Firm—Dority & Manning, P.A.

(57) ABSTRACT

A valve assembly for admitting a tube or fuel into a vehicle fuel tank is disclosed. The valve assembly has a fixed housing with an inlet, an outlet, a middle section and an inner surface with an opening. At least one projection depends from the inner surface between the inlet and the outlet. The projection deflects the tube toward and through the opening. A piston element, which is slidably mounted to the housing, is normally urged in a direction to close the outlet and the opening until the tube or fuel urges the piston element in an opposite direction.

34 Claims, 5 Drawing Sheets

U.S. PATENT DOCUMENTS

| | | |
|---|---|---|
| 5,850,851 A | 12/1998 | Miura et al. |
| 5,860,458 A | 1/1999 | Benjey et al. |
| 5,931,206 A | 8/1999 | Simdon et al. |
| 5,937,896 A | 8/1999 | Miyajima et al. |
| 5,937,922 A | 8/1999 | Hör et al. |
| 5,947,153 A | 9/1999 | Bucci et al. |
| 5,950,655 A | 9/1999 | Benjey |
| 6,000,426 A | 12/1999 | Tuckey |
| 6,012,599 A * | 1/2000 | Miura et al. ............... 220/86.2 |
| 6,026,855 A * | 2/2000 | Jackson et al. ............. 137/592 |
| 6,029,719 A | 2/2000 | Hor et al. |
| 6,056,029 A | 5/2000 | Devall et al. |
| 6,095,207 A | 8/2000 | Enders |
| 6,138,852 A | 10/2000 | Miura et al. |
| 6,155,316 A | 12/2000 | Benjey |
| 6,170,538 B1 | 1/2001 | Devall |
| 6,189,581 B1 | 2/2001 | Harris et al. |
| 6,202,882 B1 | 3/2001 | Hagano et al. |
| 6,296,014 B1 * | 10/2001 | Miura et al. ................. 137/592 |
| 6,338,362 B1 * | 1/2002 | Gabbey et al. ............. 137/588 |
| 6,340,031 B1 * | 1/2002 | Matsumoto et al. ..... 137/513.3 |
| 6,450,191 B1 * | 9/2002 | Welch ........................ 137/150 |

\* cited by examiner

VALVE ASSEMBLY FOR A FUEL TANK

FIELD OF THE INVENTION

This invention relates to a valve assembly for a fuel tank. More particularly, this invention relates to a vehicle fuel tank filler neck and a valve for admitting a tube or fuel into the fuel tank through the filler neck.

BACKGROUND OF THE INVENTION

When repairing or maintaining a vehicle, a mechanic may need to remove liquid fuel from the vehicle fuel tank before beginning maintenance. To accomplish removal of the fuel, the mechanic may insert a tube or hose through a filler neck into the fuel tank and then siphon or pump the fuel from the fuel tank. This procedure is relatively simple if the length of the filler neck is unobstructed from the filler neck inlet to the fuel tank. Other fuel tanks (not in vehicles) may also be emptied in a similar way.

In many modern vehicles, filler necks are equipped with obstructions such as fuel splash or overfill prevention mechanisms to prevent the unrestricted escape of fuel and fuel vapor from the fuel tank through the filler neck into the atmosphere. Moreover, a filler neck may not be optimally oriented on the fuel tank for an inserted siphon tube to penetrate into the liquid fuel.

BRIEF SUMMARY OF THE INVENTION

The present invention provides a valve assembly for a fuel tank for admitting a tube or fuel into the fuel tank through a filler neck in which the component parts of the valve assembly are simple and economical to manufacture, assemble, and use. Other advantages of the invention will be apparent from the following description and the attached drawings or can be learned through practice of the invention.

According to an aspect of the invention, a valve assembly for admitting a tube or fuel into a vehicle fuel tank has a fixed housing with an inlet, an outlet and a middle section located between the inlet and outlet. The housing has an inner surface with an opening and at least one projection located between the inlet and the outlet. Illustratively, the fixed housing may be connected in the fuel tank such that the outlet extends in a direction towards a bottom of the tank.

The projection in the housing depends or extends from the inner surface and is configured to deflect the tube toward and through the opening. The valve assembly may have at least one other projection, which is spaced axially apart from the first mentioned projection such that the two projections cooperate to deflect the tube toward and through the opening.

A plurality of projections can be provided. Any or all of the projections may extend substantially perpendicular from the inner surface. Moreover, at least two projections may extend parallel to each other at a common axial position in the housing in spaced apart relationship from each other.

In this aspect of the invention, the projections present a surface area that is substantially less than an open area adjacent the surface area to permit substantially unimpeded fuel passage. To facilitate better directional control of the hose, the surface area may slant from the inner surface in the direction of the outlet.

The valve assembly may include a piston element, which is slidably mounted to the housing and urged in a first direction to close the outlet and the opening. The piston element is movable in a second direction opposite the first direction by the tube or fuel. Preferably, the piston element has a substantially flat surface element and a retaining end. The flat surface element is located in the direction of the projection and spaced axially apart from the retaining end, which is located in the direction of the fuel tank. The flat surface element may be on an elevated element.

Optionally, the valve assembly may have a spring element for urging the piston element in the first direction to close the outlet and the opening. The spring element can have a spring constant such that the tube and/or fuel can move the piston element in the second direction upon insertion of the tube and/or fuel into the housing.

A sealing element may be attached circumferentially about the piston element. Additionally, an annular stop portion may extend from the inner surface for sealingly engaging the sealing element of the piston element to provide additional liquid fuel splash control.

According to another aspect of the invention, a fuel valve assembly for a fuel tank filler neck is disclosed. The fuel valve assembly includes a frame fixed in the filler neck. The frame defines a central axis and has an inlet, an outlet, a middle channel having an inner surface therein, and at least one axially extending opening therein spaced apart from the outlet for passage of a hose. The inlet is in selective communication to an atmosphere external to the fuel tank and the outlet is in selective communication with the fuel tank. The inlet and outlet are spaced apart from each other to define the middle channel.

The fuel valve assembly also has a finger element having a proximal end and a distal end. The proximal end is attached to the inner surface, and the distal end projects radially inward, substantially perpendicular to the central axis. The distal end may be tapered, and a circumferential shoulder element may be disposed about the inner surface near the at least one axially extending opening.

The fuel valve assembly also includes a piston arrangement having a piston element with an elevated surface and a guide end. A seal is spaced apart from the guide end proximate the elevated surface, and a compression piece or spring is attached to the piston element configured to urge the seal against the shoulder element. Preferably, the elevated surface has a substantially flat center and defines a curved, circumferential outer edge. A circumference of the seal is greater than the elevated surface outer edge such that the piston element is disposed concentrically to the circumference of the seal, the piston element and the finger element cooperating to protect the seal from the hose.

The piston element is further configured to resistively open the at least one axially extending opening for passage of the hose. The guide end is configured to retain the piston element in the frame in substantial axial alignment with the central axis.

In a further aspect of the invention, the at least one axially extending opening is spaced apart from the finger element such that the finger element deflects the hose through the at least one axially extending opening. Additionally, a plurality of finger elements, each having a radially slanted surface area, may be provided. A passage area is disposed about the plurality of finger elements. The passage area is substantially greater than the radially slanted surface area.

According to another aspect of the invention, a check valve assembly for a vehicle fuel tank filler neck is disclosed. The check valve assembly includes a support frame coupled to the filler neck, the support frame having a centerline and an inlet in communication with the filler neck and defining an inner surface area therein, an opening therethrough, and an outlet in communication with a fuel tank with the opening spaced axially apart from the outlet. The inlet is configured for receiving fuel and a siphon tube.

The check valve assembly is configured to deflect the tube through the opening. A protrusion or other provision is disposed on the inner surface area and may have contoured surfaces for deflecting the tube. In one aspect, the protrusion or other provision includes at least two projecting parts each having a distal end, at least one of the projecting parts disposed on the inner surface area at a point spaced axially and/or laterally apart from at least another of the projecting parts, the at least two projecting parts disposed relative to each other such that the tube must pass substantially along the centerline of the frame. Alternatively, the protrusion or other provision may be enlarged projecting parts having holes or an arrangement of openings configured to permit substantially unimpeded flow of liquid fuel past and through the means for deflecting. The holes have sufficiently small diameters, widths, or lengths so as to not ensnare the siphon tube.

A blocking element is movably disposed within the support frame in the vicinity of the opening and the outlet for sealing the opening and the outlet. The blocking element cooperates with the deflecting provision, which may have contoured surfaces, such that the tube passes through the opening when extended into and through the frame. Moreover, an abutment element may be circumferentially disposed about the blocking element and carry a seal for engaging the support frame. The abutment element can be configured to releasably urge the blocking element in a direction towards the filler neck.

Other aspects and advantages of the invention will be apparent from the following description and the attached drawings, or can be learned through practice of the invention.

BRIEF DESCRIPTION OF THE DRAWINGS

The above and other aspects and advantages of the present invention are apparent from the detailed description below and in combination with the drawings in which:

FIG. 6 is a perspective view of an embodiment of a piston element as installed in FIG. 2;

DETAILED DESCRIPTION OF THE DRAWINGS

Detailed reference will now be made to the drawings in which examples embodying the present invention are shown. The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

As broadly embodied in FIGS. 1–6, a valve assembly 10 for admitting a workpiece W such as a siphon hose or tube into a vehicle fuel tank T is provided. As described below, fuel may pass through the valve assembly 10 into the tank T.

As shown in the Figures, valve assembly 10 is connected to the vehicle fuel tank T. While the Figures illustrate a valve assembly 10 mounted in a filler neck F such that an outlet 16 extends in a direction towards a bottom of the tank T, the valve assembly 10 can be mounted to the fuel tank T utilizing a variety of other installation angles and mounting structures. Additionally, the valve assembly 10 can encompass alternate frame or housing lengths or geometries, for example, a right or obtuse angle formed in the valve assembly 10. Accordingly, it should be understood that the following description of the disclosed embodiments is not intended to limit the present invention to the examples shown in the Figures.

Figure 1:
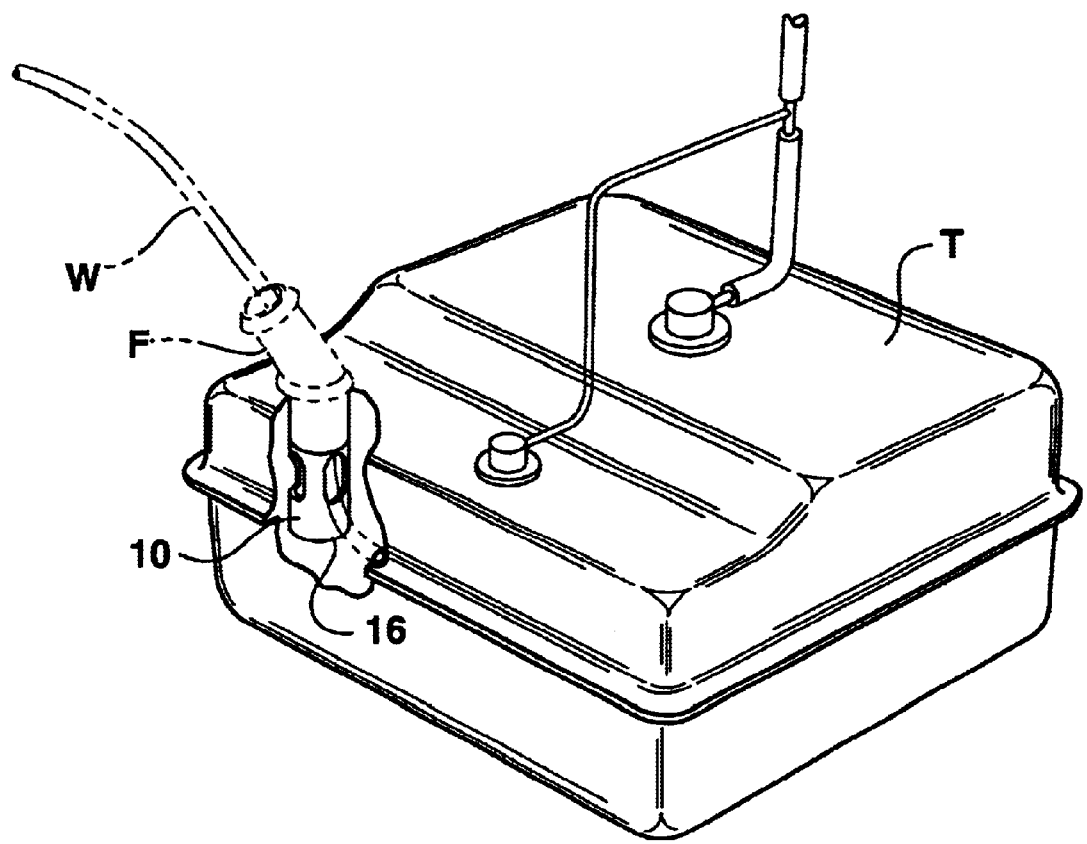
FIG. 1 is a partially broken away, perspective view of a vehicle fuel system having a fuel valve assembly illustratively installed in a filler neck of a vehicle fuel tank.
Figure 2:
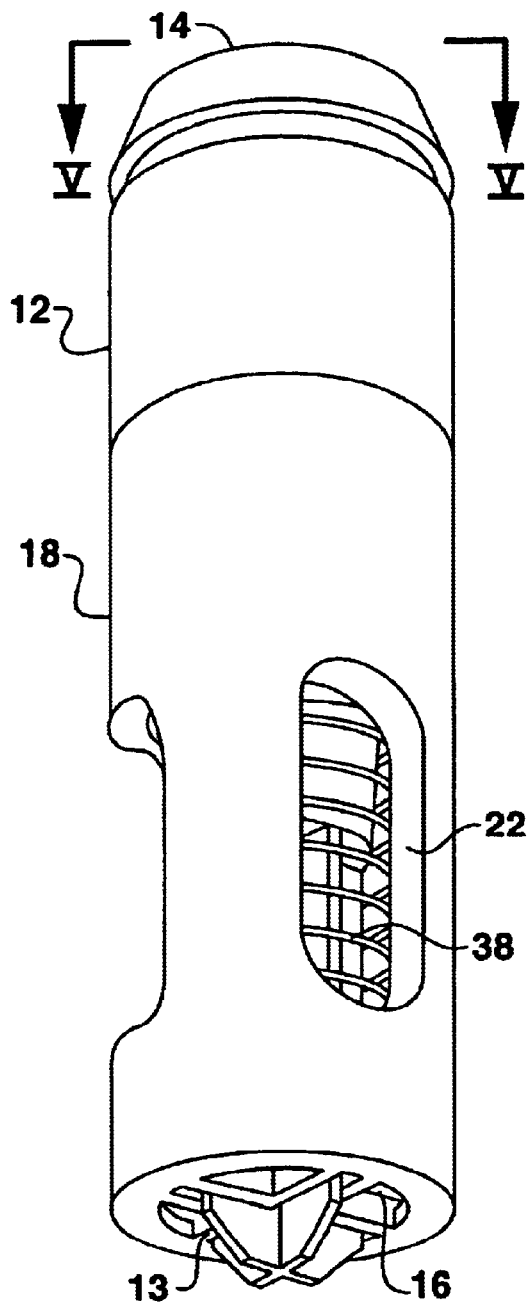
FIG. 2 is a perspective view of the fuel valve assembly in accordance with certain aspects of the present invention including a piston element shown partially obscured in a resting position within a housing.
Figure 3:
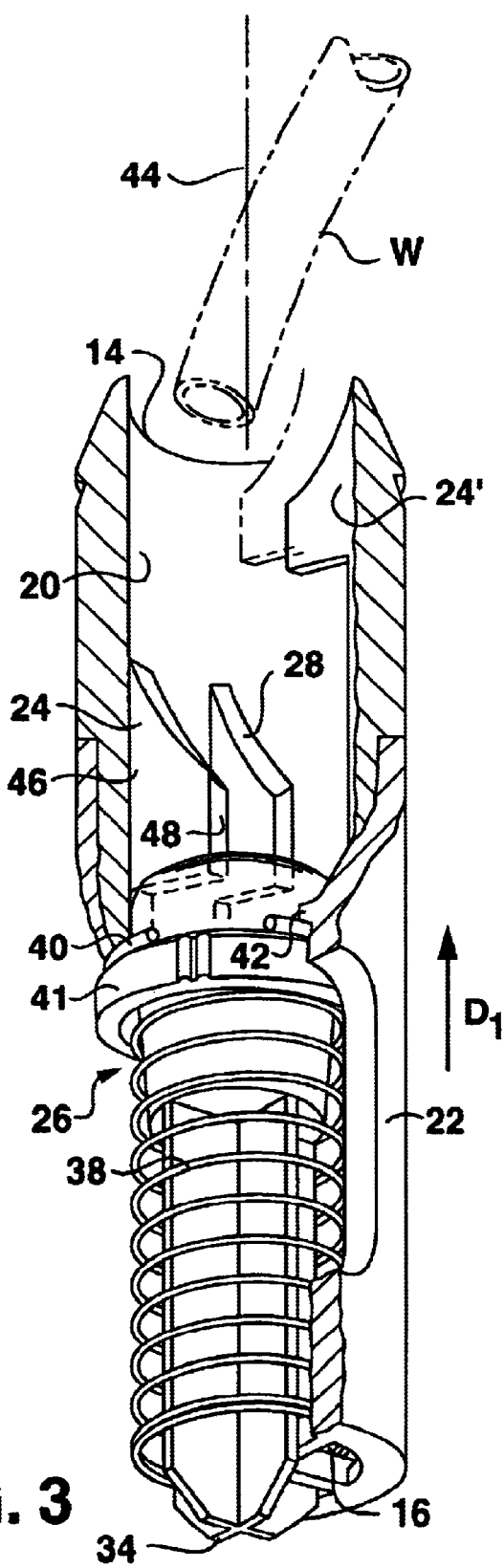
FIG. 3 is a partial sectional view of the assembly of FIG. 2 showing an embodiment of a projection and a hose or tube entering an inlet of the assembly.

With more particular reference to the Figures, valve assembly 10 is adapted to be attached to a filler neck F of a vehicle fuel tank T as shown in FIG. 1. With particular reference to FIGS. 2 and 3, valve assembly 10 includes a fixed housing 12 with a frame end 13, an inlet 14, an outlet 16 and a middle section 18. The middle section 18 is disposed between the inlet 14 and the outlet 16. Located between the inlet 14 and the outlet 16 and about the middle section 18, an inner surface 20 is defined. The inner surface 20 has at least one opening 22. As shown optionally in FIG. 4, the inner surface 20 may define more than one opening 22, such as opening 22a, opening 22b, and opening 22c. In this example, the siphon hose W passes through opening 22a while fuel may pass through all openings 22a/b/c.

Figure 4:
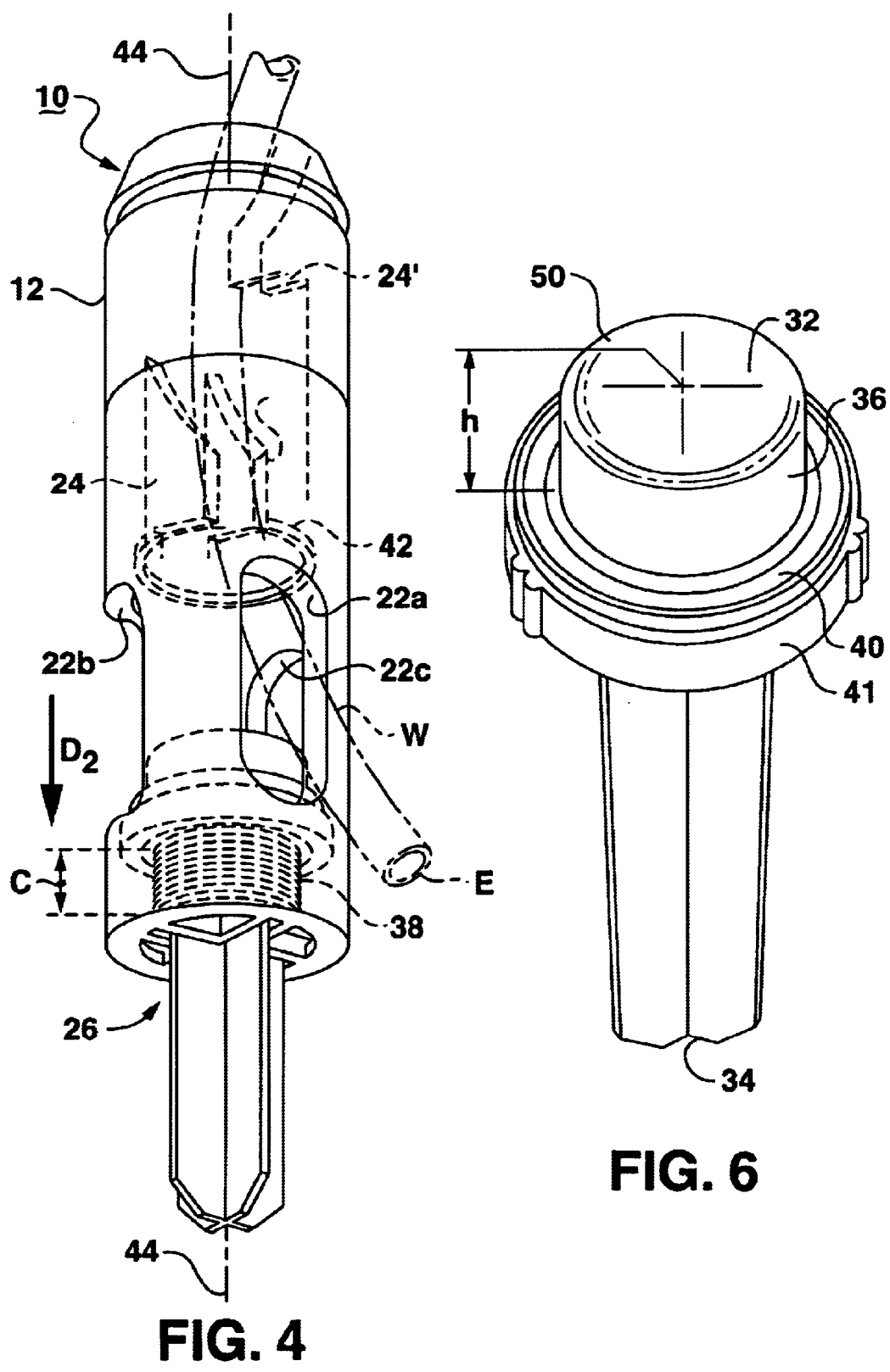
FIG. 4 is a transparent view of the housing of the FIG. 2 embodiment in which the projections can be seen through the housing engaging and directing the hose toward and through an opening in the assembly into a fuel tank (not shown) and showing the piston element displaced due to action by the inserted hose.

According to an embodiment of the invention as seen in FIG. 4, at least one projection 24 depends from the inner surface 20 disposed between the inlet 14 and the outlet 16. In use, the at least one projection 24 is configured to deflect the tube W toward and through the opening 22. Optionally, at least one other projection 24' may be spaced axially apart from the at least one projection 24 such that the at least one other projection 24' initially engages and directs the tube W away from the opening 22, and the at least one projection 24 subsequently engages and redirects the tube W towards and through the opening 22 in a serpentine fashion.

In one aspect of the invention, the opening 22 is an oblong cut-out in housing 12 proximate the piston element 26 as illustrated in FIGS. 2, 3, and 4. The selected width of the opening 22 must accommodate the width of a standard siphon hose or tube W such that the inserted tube W may exit through the opening 22 into the fuel tank T. An oblong shape for opening 22 permits the hose W to optimally exit the housing 12. Preferably, opening 22 should not extend above a seal 40, discussed later in greater detail. Although an oblong cut-out is illustrated, it should be noted that any shape (square, circular, etc.) may be employed for the opening 22 and a number of openings 22 may be formed in the housing 12 as discussed previously.

Figure 5:
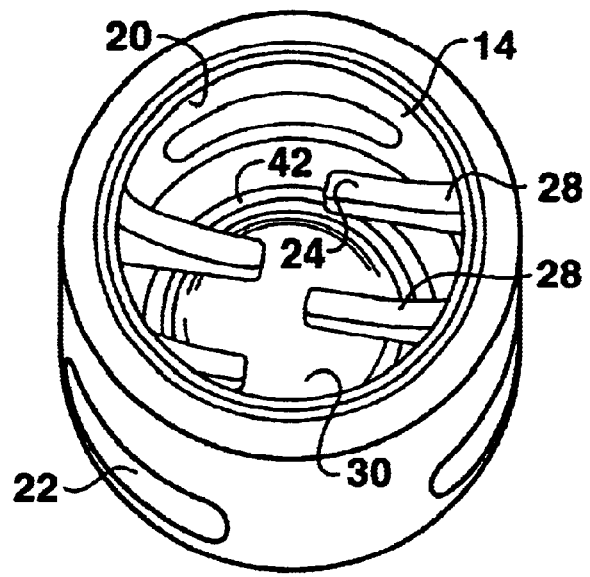
FIG. 5 is a top perspective view of the fuel valve assembly of FIG. 2 taken along line V—V in FIG. 2 and not showing the piston arrangement to better illustrate one embodiment of the projections.

As shown best in FIGS. 3 and 5, the at least one projection 24 presents a surface area 28, which is substantially less than an open area 30 adjacent the surface area 28. The surface area 28 may slant from the inner surface 20 in the direction of the outlet 16 to facilitate better directional control of the tube W in the direction of the outlet 16, as shown by example in FIG. 4.

Also shown in FIGS. 3, 4, and 5, the at least one projection 24 has sufficient surface area 28 to intercept, guide, direct and/or redirect the tube W towards the opening 22 without causing an undesirable amount of fuel splash or spray (not shown). If the at least one projection 24 presents excessive surface area 28, it could create an inordinate amount of fuel splash or spray and/or cause pressure build-up such that fuel backs up in the filler neck F to trigger premature fuel pump shut-off. Therefore, the at least one projection 24 should present sufficient surface area 28 to engage and redirect a siphon hose W but pass fuel substantially unimpeded in a direction towards the outlet 16 to avoid undue filler neck F back-up.

By way of further example, FIGS. 3, 4, and 5 illustrate that the at least one projection 24 may include a plurality of projections 24, each depending substantially perpendicular from the inner surface 20 to intercept and guide the tube W. More specifically, at least two projections 24 may depend from the inner surface 20 parallel to each other at a common axial position on the inner surface 20. Preferably, the at least two projections 24 are spaced apart from each other so as to engage the tube W without snagging it but at a sufficiently wide distance to permit liquid fuel (not shown) to pass substantially unimpeded without creating excessive fuel splash and vapor build-up as discussed previously.

Figure 7:
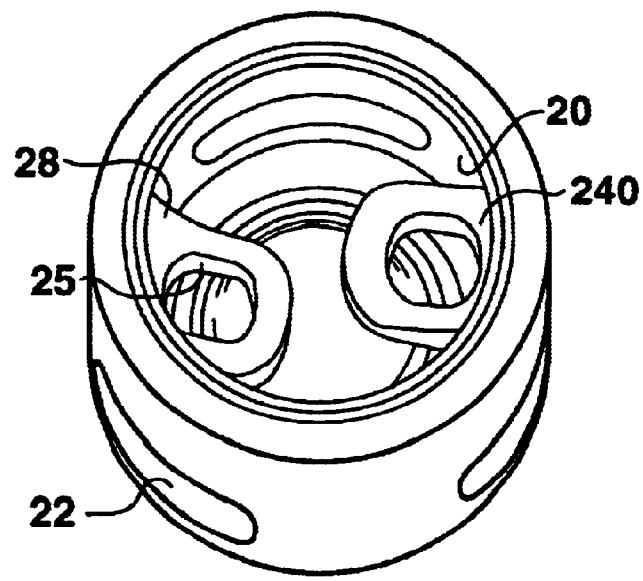
FIG. 7 is a top perspective view of an alternate arrangement of projections in which at least one of the projections defines an aperture or opening in its surface to permit fuel passage but a siphon hose does not penetrate or snag on the aperture.
Figure 8:
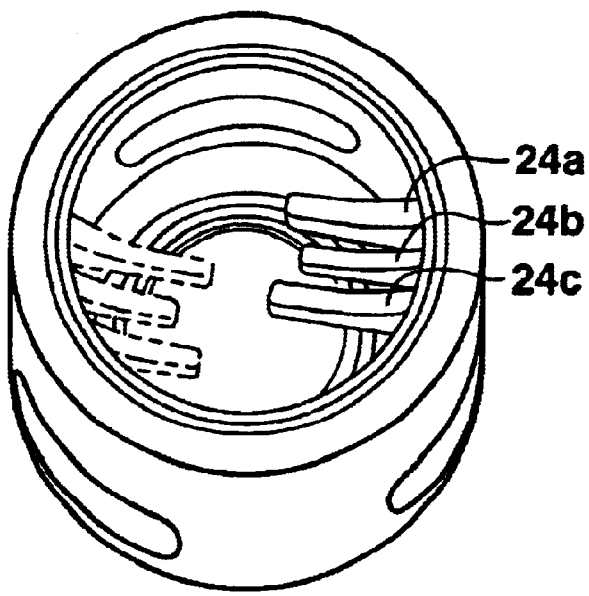
FIG. 8 is a top perspective view of an additional embodiment of projections.

Shown optionally in FIG. 8, the at least one projection 24 may have a number of projections 24a, 24b, and 24c selectively spaced to accommodate various sizes and diameters of a variety of siphon hoses W on the market. It should be understood that more than three projections 24a/b/c, as shown in FIG. 8, can be provided. Moreover, additional projections 24 may be disposed substantially opposite or offset from projections 24a/b/c as suggested in the embodiments of FIGS. 5, 7, 8 (shown in phantom), and 9.

According to one embodiment, the valve assembly 10 includes a piston element 26, shown for clarity independent of the valve assembly 10 in FIG. 6. The piston element 26 may have a substantially flat surface element 32 and a retaining end 34. The flat surface element 32 is disposed in the direction of the at least one projection 24 and spaced axially apart from its retaining end 34 (see FIG. 3). The piston element 26 has an elevated element 36 upon which the flat surface element 32 is defined. The elevated element 36 extends a height (h) as indicated by FIG. 6. The height (h) protects the sealing element 40, described in greater detail below, from damage by an inserted siphon hose W.

The retaining end 34 may be X-shaped, as shown in FIGS. 2, 3 and 4, to maintain the piston element 26 centrally in the housing 12 in cooperation with the frame end 13. Thus, the frame end 13 has a corresponding X-shape to receive and contain the retaining end 34 as the retaining end 34 slidably moves within the housing 12 during operation of the valve assembly 10. However, these alignment elements could have configurations other than X-shapes, such as irregular, round, or needle/hole combinations, and remain within the scope of the invention.

As illustrated in FIGS. 3 and 4, piston element 26 is slidably mounted to the housing 12. FIG. 3 further indicates that piston element 26 is configured to be urged, for example by a compression spring, in a first direction $D_1$ to close the outlet 16 and the opening 22. Conversely, the piston element 26 is movable in a second direction $D_2$ opposite the first direction $D_1$ by fuel or tube W as seen in FIG. 4. This operation is discussed in greater detail below.

As FIGS. 2, 3, and 4 show, the valve assembly 10 preferably comprises a spring element 38 for urging the piston element 26 in the first direction $D_1$. The spring constant of spring element 38 is such that the tube W must overcome the spring constant to move the piston element 26 in the second direction $D_2$ upon insertion of the tube W into the housing 12 as shown in FIG. 4. Likewise, fuel can move the piston element 26 in the second direction $D_2$ when fuel is passed into the housing 12 by a fuel pump (not shown).

To control unwanted fuel spillage or to reduce fuel vapor leaks, a sealing element 40 may be attached circumferentially about the piston element 26 in one embodiment of the invention. As shown best in FIGS. 3 and 6, the sealing element 40 is operable to prevent fuel or vapor from escaping past the piston element 26 in a direction of the filler neck F when the piston element 26 is stationary in direction $D_1$. In operation, the sealing element 40 sealingly engages an annular stop portion 42 (FIGS. 3 and 5) depending from the inner surface 20 to prevent fuel or vapors from escaping. Annular stop portion 42 has a second function in that it prevents piston element 26 from overextending in a direction of the at least one projection 24. In other words, annular stop portion 42 cooperates with the frame end 13 to maintain the piston element 26 in the housing 12 such that a spring 38 remains in compression within a suitable range for a selected spring constant.

An example of the operation of the valve assembly 10, in which the at least one projection 24 deflects the tube W toward the opening 22, is shown in FIG. 4. Prior to the tube W exiting the valve assembly 10 into the fuel tank through the opening 22, an end E of tube W engages the piston element 26 to overcome the urge of piston element 26 in direction $D_1$ by spring element 38. The insertion force of tube W thus moves the piston element 26 in the direction $D_2$ until the tube W is deflected through the opening 22 and into the fuel tank T of FIG. 1. The resulting deflection and exit of the tube W is assured by the compressed height C of the spring 38 as shown in FIG. 4. In other words, the spring 38, when compressed against the frame end 13, eventually stops the axial movement of piston element 26 in direction $D_2$ and likewise, the axial movement of the inserted tube W. Thus, continued insertion of tube W from outside the filler neck F forces end E to exit the housing 12 substantially radially through the opening 22 into the fuel tank T.

According to an alternate embodiment of the invention, and as shown in FIGS. 3–6, a fuel valve assembly 10 for a vehicle fuel tank T has a frame 12 fixed in a filler neck F. The frame 12 defines a central axis 44 and includes an inlet 14, an outlet 16, and a middle channel 18 having an inner surface 20 therein. At least one axially extending opening 22 in the frame 12 is provided. The opening 22 is preferably spaced apart from the outlet 16 for passage of a hose W such that the hose W is deflected through the opening 22, described in greater detail below, before the hose W reaches the outlet 16.

The inlet 14 of the frame 12 is in selective communication to an atmosphere external to the vehicle fuel tank T, and the outlet 16 is in restricted communication with the vehicle fuel tank T. The inlet 14 and outlet 16 are spaced apart from each other to define the middle channel 18.

Preferably, a finger element 24 having a proximal end 46 and a distal end 48 is provided in this exemplary embodiment. The proximal end 46 is attached to the inner surface 20 while the distal end 48 projects radially inward to the frame 12 and substantially perpendicular to the central axis 44. If desired, the distal end 48 may be tapered to allow relatively undisturbed passage of fuel or a siphon hose W, described further below.

To better seal the fuel valve assembly 10 when fuel or tube W is not being introduced, a circumferential shoulder element 42 is disposed about the inner surface 20 proximate the at least one axially extending opening 22. The shoulder element 42 is engaged by a seal 40, described below, to seal liquid fuel and fuel vapor in the tank T.

A piston arrangement 25 is provided in this exemplary embodiment in which the piston arrangement 25 has a piston element 26 with a guide end 34 and an elevated surface 36. The seal 40 is disposed proximate the elevated surface 36. A compression piece 38 is attached to the piston element 26, the compression piece 38 configured to urge the seal 40 against the shoulder element 42 in the direction $D_1$ as shown in FIG. 3. The compression piece 38 is further configured to resist opening the at least one axially extending opening 22 for passage of the hose W.

As shown in FIGS. 3 and 4, the guide end 34 is configured to retain the piston element 26 in the frame 12 in substantial axial alignment with the central axis 44. During use, the guide end maintains alignment of the piston element 26, for example, by interaction with the frame end 13 shown in FIG. 2.

Preferably, the at least one axially extending opening 22 is spaced apart from the finger element 24 such that the finger element 24 deflects the hose W through the at least one axially extending opening 22. Moreover, a plurality of finger elements 24 may be provided, each having a radially slanted surface area 28. A passage area 30 is disposed about the plurality of finger elements 24 and is substantially greater than the radially slanted surface area 28 to allow substantially unimpeded or undisturbed passage of liquid fuel (not shown).

Optionally, at least one of the finger elements 240 may have an aperture 25 through the surface area 28 as shown in FIG. 7. In this example, the hose W is deflected by the at least one of the finger elements 240 while fuel may pass substantially unimpeded through the aperture 25 and around the at least one of the finger elements 240 into the fuel tank T. If desired, the elements 240 could be further configured to restrict or impede passage of the hose W while not substantially interfering with fuel passage. Additionally, or alternatively, the elements 240 could be configured to restrict passage of all but a specially designed hose (not shown), which is made complementary to the invention. For example, the specially designed hose could be sold with the invention as a part of a kit (not shown).

The elevated surface 36 in the example embodiment has a substantially flat center 32 and defines a curved, circumferential outer edge 50. The circumference of the seal 40 is greater than the elevated surface outer edge 50 such that the piston element 26 is disposed concentrically to the circumference of the seal 40. In use, the piston arrangement 25 cooperates with the finger element 24 to protect the seal 40 from the hose W.

After it is directed by finger element 24, hose W engages the flat center 32 of the piston element 26 and overcomes the spring constant of the compression piece 38. At engagement, the hose W strikes the flat center 32 approximately near the central axis 44 of the frame 12. After the spring constant is overcome, the piston arrangement 25 compresses in the direction $D_2$, shown in FIG. 4, until the hose W slips through the opening 22. Optimally, the height (h) of the elevated element 36 (FIG. 6), in cooperation with flat center 32 and the curved, circumferential outer edge 50, prevents the hose W from contacting the seal 40 before the hose W is forced through the opening 22 as seen in FIG. 4 and as previously described in foregoing embodiments.

According to one embodiment of the invention, also illustrated in FIGS. 1–6, a check valve assembly 10 for a vehicle fuel tank T is provided in which a support frame 12 is coupled to a filler neck F. The support frame 12 has a centerline 44 and an inlet 14 in communication with the filler neck F. The support frame 12 has an inner surface area 20, an opening 22, and an outlet 16 in communication with the fuel tank T. The opening 22 is spaced axially apart from the outlet 16, and the inlet 14 is configured for receiving fuel and a siphon tube W.

Figure 9:
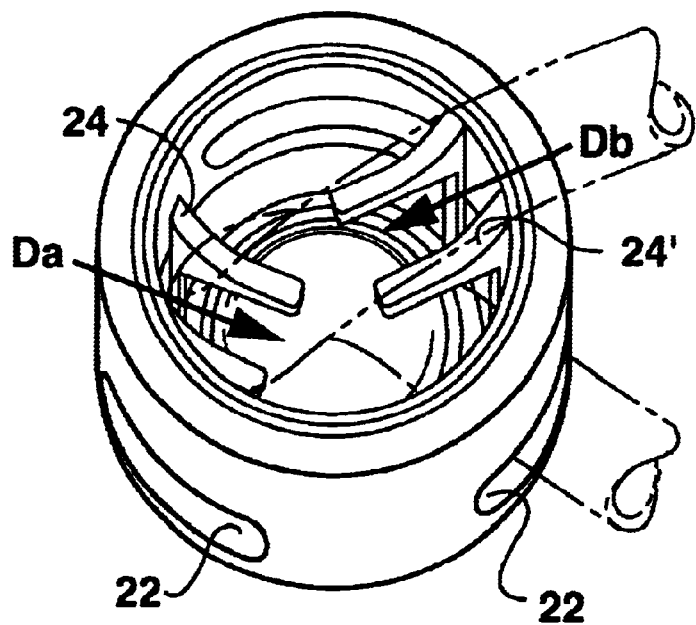
FIG. 9 is a top perspective view of an alternate arrangement of projections optionally arranged to accommodate an angled filler neck in which a siphon hose passes through at least one corner (not shown) in the filler neck before exiting the opening into the fuel tank.

FIGS. 3, 4, and 5 further illustrate an aspect of the invention in which means for deflecting the tube W through the opening 22 are provided. The means for deflecting may depend from the inner surface area 20, and specifically, may include at least two projecting parts 24 each having a distal end 48 and contoured surfaces to better guide the tube W. As shown optionally in FIG. 9, the at least two projecting parts 24 may depend from the inner surface area 20 at a point in the frame 12 spaced axially and laterally apart from each other. In this example of off-setting the at least two projecting parts 24 for use in an angled filler neck or corner tank installation, at least one of the projecting parts 24' is configured to direct the tube W in a first direction Da and the at least another of the projecting parts 24 is configured to direct the tube W in a second direction Db differing from the first direction $D_a$ towards the opening 22.

At least one of the projecting parts 24 may depend from the inner surface area 20 at a point spaced laterally and/or axially apart from at least another of the projecting parts 24 as shown in FIG. 3. Preferably, the at least two projecting parts 24 are disposed relative to each other such that the tube W must pass substantially along the centerline 44 of the frame 12. In use, the at least one of the projecting parts 24 first directs the tube W away from the opening 22 until the tube W reaches the at least another of the projecting parts 24, which directs the tube W towards and through the opening 22 in a serpentine manner.

It should be understood that means for deflecting may be any suitable arrangement to deflect the tube W through the 22. For instance, a larger projection 240 having a slot or aperture 25 in its surface 28 may be configured to effectively deflect and guide the tube W without snagging the tube W and without creating unwanted fuel splash or vapor build-up.

Preferably, an alternate embodiment includes a blocking element 26 movably disposed within the support frame 12 proximate the outlet 16 and the opening 22 for sealing the outlet 16 and the opening 22. The blocking element 26 may include a seal or sealing element 40 as previously described. The seal 40 is optimally disposed about or on a circumferential abutment element 41, which itself is disposed about the blocking element 26.

In practice, when the blocking element 26 is not being displaced by a workpiece such as a siphon hose W or fuel the abutment element 41 compresses the seal 40 against a stopping element 42 depending from the inner surface 20 as discussed in previous embodiments of the invention. Thus, the blocking element 26, when urged in a direction towards the filler neck F, releasably seals outlet 16 and the opening 22 in cooperation with the seal 40, abutment element 41, and stopping element 42 as shown by example in FIG. 3.

As shown in FIG. 4, the blocking element 26 also cooperates with the previously described means for deflecting such that the tube W passes through the opening 22 when the tube W is extended into and through the frame 12. Further, to facilitate siphoning of fuel from the tank T after tube W is passed through the support frame 12, frame 12 may be disposed in the fuel tank T such that the outlet 16 extends in a direction towards a bottom of the tank T.

While preferred embodiments of the invention have been shown and described, those skilled in the art will recognize that other changes and modifications may be made to the foregoing embodiments without departing from the scope and spirit of the invention. For example, specific shapes of various elements of the illustrated embodiments may be altered to suit particular applications. It is intended to claim all such changes and modifications as fall within the scope of the appended claims and their equivalents.

That which is claimed is:

1. A valve assembly for admitting a tube or fuel into a fuel tank, the valve assembly comprising:
   a fixed housing with an inlet, an outlet and a middle section disposed between the inlet and outlet, and defining an inner surface therein, the inner surface defining an opening therethrough;
   at least one projection disposed between the inlet and the outlet and depending from the inner surface, the at least one projection configured to deflect the tube toward and through the opening; and.
   a piston element slidably mounted to the housing and urged in a first direction to close the outlet and the opening, the piston element being movable in a second direction opposite the first direction by the tube or fuel to open the outlet and the opening.

2. The valve assembly of claim 1, further comprising at least one other projection, the at least one projection spaced axially apart from the at least one other projection such that the at least one projection and the at least one other projection cooperate to deflect the tube toward and through the opening.

3. The valve assembly of claim 1, wherein the at least one projection includes a plurality of projections.

4. The valve assembly of claim 1, wherein the at least one projection depends substantially perpendicular from the inner surface.

5. The valve assembly of claim 1, wherein the at least one projection presents a surface area substantially less than an open area adjacent the surface area.

6. The valve assembly of claim 5, wherein the surface area slants from the inner surface in the direction of the outlet.

7. The valve assembly of claim 1, wherein the at least one projection includes at least two projections depending from the inner surface in parallel to each other at a common axial position and spaced apart from each other.

8. The valve assembly of claim 1, wherein the piston element has a substantially flat surface element and a retaining end, the flat surface element disposed in the direction of the at least one projection and spaced axially apart from the retaining end.

9. The valve assembly of claim 8, wherein the piston element has an elevated element, the flat surface element defined on the elevated element.

10. The valve assembly of claim 1, further comprising a spring element for urging the piston element in the first direction.

11. The valve assembly of claim 10, wherein the spring element has a spring constant such that the tube can move the piston element in the second direction upon insertion of the tube into the housing.

12. The valve assembly of claim 10, wherein the spring element has a spring constant such that the fuel can move the piston element in the second direction when fuel is passed into the housing.

13. The valve assembly of claim 1, further comprising a sealing element attached circumferentially about the piston element.

14. The valve assembly of claim 13, further comprising an annular stop portion depending from the inner surface for sealingly engaging the sealing element of the piston element.

15. The valve assembly of claim 1, wherein the fixed housing is disposed in the fuel tank such that the outlet extends in a direction generally towards a bottom of the tank.

16. The valve assembly of claim 1, wherein the at least one projection is configured to pass fuel substantially unimpeded in the second direction.

17. A fuel valve assembly for a fuel tank filler neck, the fuel valve assembly comprising:
   a frame fixed in the filler neck, the frame defining a central axis and including an inlet, an outlet, a middle channel having an inner surface therein, at least one axially extending opening therein spaced apart from the outlet for passage of a hose, the inlet in selective communication to an atmosphere external to the vehicle fuel tank, the outlet in selective communication with the vehicle fuel tank, and the inlet and outlet spaced apart from each other to define the middle channel;
   a finger element having a proximal end and a distal end, the proximal end attached to the inner surface, the distal end projecting radially inward and substantially perpendicular to the central axis;
   a circumferential shoulder element disposed about the inner surface proximate the at least one axially extending opening; and
   a piston arrangement having a piston element with a guide end, a seal spaced apart from the guide end, and a spring attached to the piston element configured to urge the seal against the shoulder element and further configured to resistively open the at least one opening for passage of the hose, the guide end configured to retain the piston element in the frame in substantial axial alignment with the central axis.

18. The fuel valve assembly of claim 17, wherein the at least one opening is spaced apart from the finger element such that the finger element deflects the hose through the at least one opening.

19. The fuel valve assembly of claim 17, further comprising a plurality of finger elements each having a radially slanted surface area, and wherein a passage area disposed about the plurality of finger elements is substantially greater than the radially slanted surface area.

20. The fuel valve assembly of claim 19, wherein the surface area of at least one of the plurality of finger elements defines an aperture therethrough such that the hose is deflected by the at least one of the plurality of finger elements and fuel passes through the aperture.

21. The fuel valve assembly of claim 17, wherein the distal end is tapered.

22. The fuel valve assembly of claim 17, wherein the piston element has an elevated surface with a substantially flat center and a curved, circumferential outer edge, and wherein a circumference of the seal is greater than the elevated surface outer edge such that the piston element is disposed concentrically to the circumference of the seal, the piston element and the finger element cooperating to protect the seal from the hose.

23. The fuel valve assembly of claim 17, wherein the frame is disposed in the fuel tank such that the outlet extends in a direction towards a bottom of the fuel tank.

24. The fuel valve assembly of claim 17, wherein the finger element is configured to pass fuel substantially unimpeded in a direction substantially towards a bottom of the fuel tank.

25. The fuel valve assembly of claim 17, further comprising a plurality of finger elements.

26. A check valve assembly for a fuel tank filler neck comprising:
 a support frame coupled to the filler neck, the support frame having a centerline and an inlet in communication with the filler neck and defining an inner surface area therein, an opening therethrough, an outlet in communication with a fuel tank with the opening spaced axially apart from the outlet, the inlet configured for receiving fuel and a siphon tube;
 means for deflecting the tube through the opening, the means for deflecting disposed on the inner surface area; and
 a blocking element movably disposed within the support frame proximate the opening and the outlet for sealing the opening and the outlet, the blocking element cooperating with the means for deflecting such that the tube passes through the opening when the tube is extended into and through the frame.

27. The check valve assembly of claim 26, wherein the means for deflecting has contoured surfaces for deflecting the hose.

28. The check valve assembly of claim 26, wherein the means for deflecting includes at least two projecting parts each having a distal end, at least one of the projecting parts depending from the inner surface area at a point spaced laterally apart from at least another of the projecting parts, the at least two projecting parts disposed relative to each other such that the tube must pass substantially along the centerline of the frame.

29. The check valve assembly of claim 26, wherein the means for deflecting includes at least two projecting parts each having a distal end, at least one of the projecting parts depending from the inner surface area at a point in the frame spaced axially apart from at least another of the projecting parts, the at least two projecting parts disposed relative to each other such that the tube must pass substantially along the centerline of the frame.

30. The check valve assembly of claim 29, wherein the at least two projecting parts depend from the inner surface area at a point in the frame spaced axially and laterally apart from each other, the at least one of the projecting parts configured to direct the tube in a first direction and the at least another of the projecting parts configured to direct the tube in a second direction different from the first direction towards the opening.

31. The check valve assembly of claim 29, wherein the at least one of the projecting parts is configured to engage the tube such that the tube is directed away from the opening, and the at least another of the projecting parts is configured to engage the tube to direct the tube towards the opening.

32. The check valve assembly of claim 26, wherein the support frame is disposed in the fuel tank such that the outlet extends in a direction towards a bottom of the tank to facilitate siphoning of fuel from the tank.

33. The check valve assembly of claim 26, wherein the means for deflecting is configured such that fuel may pass substantially unimpeded.

34. The check valve assembly of claim 26, further comprising an abutment element and a stopping element, the abutment element circumferentially disposed about the blocking element and carrying a seal for engaging the stopping element, the abutment element configured to releasably urge the blocking element against the stopping element in a direction towards the filler neck.

\* \* \* \* \*